United States Patent [19]

Arai et al.

[11] Patent Number: 5,145,812
[45] Date of Patent: Sep. 8, 1992

[54] MOLDED ARTICLES FORMED OF SILICON NITRIDE BASED CERAMIC AND PROCESS FOR PRODUCING SAME

[75] Inventors: Mikiro Arai; Osamu Funayama; Hayato Nishii; Tamio Ishiyama, all of Iruma; Hiroshi Kaya; Takeshi Isoda, both of Niiza; Kouichi Yasuda, Yokohama; Atsuro Takazawa, Omiya; Tadashi Suzuki, Iruma; Ichiro Kohshi, Kamifukuoka; Masaaki Ichiyama, Kamifukuoka; Tomohiro Kato, Kamifukuoka, all of Japan

[73] Assignee: Toa Nenryo Kogyo Kabushiki Kaisha, Japan

[21] Appl. No.: 747,488

[22] Filed: Aug. 19, 1991

Related U.S. Application Data

[63] Continuation of Ser. No. 501,969, Mar. 29, 1990, abandoned, which is a continuation of Ser. No. 316,397, Feb. 27, 1989, abandoned.

[30] Foreign Application Priority Data

Feb. 29, 1988 [JP] Japan ................................. 63-46966
Feb. 29, 1988 [JP] Japan ................................. 63-46967
Mar. 3, 1988 [JP] Japan ................................. 63-48713

[51] Int. Cl.$^5$ ............................................. C04B 35/58
[52] U.S. Cl. ........................................ 501/97; 501/88; 501/92; 501/95; 501/98
[58] Field of Search .................. 501/88, 92, 95, 96, 501/97, 98

[56] References Cited

U.S. PATENT DOCUMENTS

| | | | |
|---|---|---|---|
| 3,853,567 | 12/1974 | Verbeek | 106/44 |
| 3,892,583 | 7/1975 | Winter et al. | 106/55 |
| 4,397,828 | 8/1983 | Seyferth et al. | 501/97 X |
| 4,482,669 | 11/1984 | Seyferth et al. | 524/442 |
| 4,640,902 | 2/1987 | Lange | 501/97 |
| 4,650,733 | 3/1987 | Okamura et al. | 501/35 |
| 4,652,276 | 3/1987 | Burden | 501/98 |
| 4,659,850 | 4/1987 | Arai et al. | 556/409 |
| 4,671,912 | 6/1987 | Komatsu | 501/97 |
| 4,711,665 | 12/1987 | Simkovich | 501/97 |
| 4,711,860 | 12/1987 | Gadkaree et al. | 509/97 |
| 4,716,028 | 12/1987 | Kasai et al. | 501/97 |
| 4,720,532 | 1/1988 | Seyferth, II et al. | 501/97 |
| 4,746,636 | 5/1988 | Yokoyama | 501/96 |
| 4,757,035 | 7/1988 | Baney et al. | 501/88 |
| 4,761,389 | 8/1988 | Rabe et al. | 501/98 |
| 4,767,831 | 8/1988 | Bartos et al. | 525/474 |
| 4,769,350 | 9/1988 | Nishioka et al. | 501/98 |
| 4,771,118 | 9/1988 | Takamizawa et al. | 528/14 |
| 4,795,724 | 1/1989 | Soma et al. | 501/98 |
| 4,810,678 | 3/1989 | Hirosaki et al. | 501/97 |
| 4,820,783 | 4/1989 | Seyferth et al. | 501/97 |
| 4,843,043 | 6/1987 | Nishio | 501/97 |

FOREIGN PATENT DOCUMENTS

| | | |
|---|---|---|
| 0175382 | 9/1985 | European Pat. Off. . |
| 0227283 | 11/1986 | European Pat. Off. . |
| 0250073 | 4/1987 | European Pat. Off. . |
| 49-202062 | 2/1974 | Japan . |
| 61-129151 | 1/1986 | Japan . |
| 61-151005 | 7/1986 | Japan . |
| 61-295273 | 12/1986 | Japan . |
| 62-202863 | 9/1987 | Japan . |

*Primary Examiner*—Karl Group
*Attorney, Agent, or Firm*—Lorusso & Loud

[57] ABSTRACT

A molded body formed of a silicon nitride-based ceramic containing Si and N and optionally O, C and/or a metal. The ceramic is formed from a polysilazane. A molded body may be a composite body which is composed of a matrix of the ceramic and a reinforcing material such as powder or fiber embedded within the matrix or which is composed of ceramic powder bound with a binder formed of the silicon nitride-based ceramic.

43 Claims, No Drawings

MOLDED ARTICLES FORMED OF SILICON NITRIDE BASED CERAMIC AND PROCESS FOR PRODUCING SAME

This application is a continuation of application Ser. No. 07/501,969, filed Mar. 29, 1990, now abandoned, which is a continuation of application Ser. No. 07/316,397, filed Feb. 27, 1989, now abandoned.

This invention relates to a molded article formed of a silicon nitride-based ceramic and a process for producing same.

Silicon nitride has been attracting much attention for its favorable properties such as electrical insulation and its resistance to heat, oxidation, wearing, chemicals and impact. It will find wide use for gas turbine blades, engine parts, cutting tools, etc. in the near future.

The following molded, ceramic articles have thus far been proposed:
1) Molded articles formed of a homogeneous mixture of silicon carbide and silicon nitride obtained by calcining an organosilazane which is produced by reaction of a halosilane with ammonia (Japanese Tokkyo Kokai Nos. 49-69717, 49-20206 and 62-202863 and U.S. Pat. No. 4,482,669);
2) Coating films, plates and crucibles formed of a silicon nitride obtained by the CVD method from silicon tetrachloride and ammonia (FC Report 5, No. 8, 287 (1987));
3) Molded articles obtained a method including the steps of filling a mold cavity with a liquid silazane obtained by reacting a dihydrodihalosilane with ammonia, and thermally decomposing the silazane at 500°-1200° C. in an oxygen-free and moisture-free atmosphere (U.S. Pat. No. 4,397,828, Material Science Research Vol. 17, 271 (1984), Comm. Amer. Ceram. Soc., C-13 (1983));
4) Continuous inorganic fibers consisting essentially of Si, N and O and obtained by a method including the steps of infusiblizing polycarbosilane fibers having a Si-C skeleton with an oxidizing gas, and nitrifying the infusible product at 800°-1650° C. in an atmosphere of ammonia (Japanese Tokkyo Kokai No. 61-12915);
5) Silicon nitride powder of alpha-type crystals obtained by a method including the steps of nitrifying a polysilazane containing a recurring unit of =Si—NH— at 350°-1000° C. in an atmosphere of ammonia, and calcining the nitrification product at 1300°-1700° C. (Japanese Tokkyo Kokai No. 61-151005); and
6) Ceramic materials obtained by a method including the steps of treating a polysilazane with steam or a mixture of steam and oxygen to render the polysilazane infusible, and calcining the treated product at 750° C. or more under vacuum or in an atmosphere of an inert gas or ammonia (Japanese Tokkyo Kokai No. 61-295273).

These molded articles or ceramic materials are, however, not fully satisfactory for commercial applications for the reasons as set forth below:

The molded article of (1) above has a high content of free carbon because its raw material contains a high content of carbon atoms. The residual carbon at a high temperature causes a phase separation or reacts so that the inherent properties of ceramics such as electrical insulation, resistance to impact and mechanical strength are reduced. The molded article of (2) is economically disadvantageous because its manufacturing process is complicated and costly. Since the method for the production of the article of (3) fails to form sufficient cross-linkages before the thermal decomposition at 500°-1200° C., low boiling point silazanes and radicals form and vaporize during the thermal decomposition thereby forming cracks or voids during the course of the thermal decomposition and, thus, the molded articles have diameters of only several mm and are fragile. It is not possible to obtain molded articles other than fibers in the case of (4) because, during the nitrification stage reactions resulting in the cleavage of Si—CH$_3$, bonds and Si—CH—Si bonds proceed violently, thereby forming cracks and voids. In the case of (5), because the formation of cross-linkages not effected sufficiently before the nitrification at 350°-1600° C., low boiling point silazanes and radicals are form and vaporize during the thermal decomposition thereby forming cracks or voids during the nitrification treatment and, thus, molded articles of desired shape cannot be obtained. In the case of (6), the infusiblization treatment causes Si—H bonds of the polysilazane to be hydrolysed violently so that a molded article having a desired shape cannot be obtained.

For the purpose of improving mechanical strength, it is known to incorporate a reinforcing material into molded articles of ceramics. In known composite molded articles, ceramic powder such as silicon nitride, silicon carbide, alumina or silica is used to form the ceramic matrix. The use of such ceramic powder for the formation of ceramic matrix of the composite article, however, renders uniform dispersing of the reinforcing material difficult. As a result, intended improvement in mechanical properties such as breaking strength and toughness cannot be attained in a satisfactory manner.

Molded articles of a ceramic material produced using ceramic powder are also known. Since it is difficult to sinter ceramic powder such as silicon nitride or silicon carbide, a sintering aid (or binder) is generally used for densifying the molded articles. For example, alumina, yttria or magnesia is used for the formation of molded articles of silicon nitride ceramic. Also preceramic polymers such as polycarboxsilanes, polytitanocarbosilane a polymethylsilazanes are used as such a sintering aid. The former, inorganic binder should form a glass phase in order for the ceramic powder to be sintered at a low temperature. The formation of the glass phase, however, unavoidably causes a reduction of resistance to oxidation, heat and chemicals. The latter, organic binder cannot sufficiently increase the density and strength of the molded articles because of its low thermal decomposition yield.

SUMMARY OF THE INVENTION

The present invention has been made in view of the foregoing problems in known molded articles of ceramic materials. In accordance with one aspect of the present invention there is provided a molded body formed of a silicon nitride-based ceramic containing Si and N in amounts providing an atomic ratio N/Si of 0.04 to 3.

In another aspect, the present invention provides a composite, molded body formed of a silicon nitride-based ceramic containing Si and N in amounts providing an atomic ratio N/Si of 0.04 to 3 and a reinforcing material.

In a further aspect, the present invention provides process for producing a molded article, comprising the steps of:

filling a mold cavity with a raw material containing a polysilazane having a number average molecular weight of 100–500,000 and a main skeletal structure having the following recurring units:

wherein $R^1$, $R^2$ and $R^3$ represent, independently from each other, hydrogen, a hydrocarbyl group, an alkylsilyl group, an alkylamino group or an alkoxy group;

heating said raw material at a temperature from room temperature to about 400° C. to solidify said polysilazane in said mold cavity; and calcining said solidified product to obtain a molded article formed of a silicon nitride-based ceramic.

In a further aspect, the present invention provides a process for the production of a fiber-reinforced preceramic, comprising the steps of:

impregnating fibers with a liquid containing a polysilazane having a number average molecular weight of 100–500,000 and a main skeletal structure having the following recurring units:

wherein $R^1$, $R^2$ and $R^3$ represent independently from each other, hydrogen, a hydrocarbyl group, an alkylsilyl group, an alkylamino group or an alkoxy group; and solidifying said polysilazane to form a prepreg.

The present invention also provides a process for producing molded, ceramic article, comprising the steps of:

providing a solution of a polysilazane having a number average molecular weight of 100–500,000 and a main skeletal structure having the following recurring units:

wherein $R^1$, $R^2$ and $R^3$ represent, independently from each other, hydrogen, a hydrocarbyl group, an alkylsilyl group, an alkylamino group or an alkoxy group;

mixing said solution with a finely divided ceramic powder to form a slurry;

molding said slurry to form a molded body with said polysilazane serving as a binder; and calcining said molded body to form a molded ceramic article.

DESCRIPTION OF THE PREFERRED EMBODIMENT

The present invention will now be described in detail below.

The novel molded body according to the present invention is formed of a silicon nitride-based ceramic containing Si and N in amounts providing an atomic ratio N/Si of 0.04 to 3.

The silicon nitride-based molded body may further contain at least one element selected from the group consisting of O, C, and metals in amounts providing the following atomic ratios:

O/Si : 0.05–15,
C/Si : 7 or less,
M/Si : 9 or less, where M stands for the metals.

Atomic ratios outside of the above ranges tend to cause a reduction of the mechanical strength, resistance to heat and wear or the like properties of the molded body. The incorporation of oxygen or carbon can improve wettability of the molded body. Incorporation of a metal into the ceramic provides unique properties which vary with the kind of the metal used. Generally, electrical conductivity, dielectric property and compatibility with a reinforcing material such as fibers can be improved by the addition of the metal. Preferred atomic ratios are as follows:

N/Si : 0.1 to 1.7,
O/Si : 0.1 to 10,
C/Si : 5 or less,
M/Si : 5 or less.

More preferred ranges are as follows:
N/Si : 0.3 to 1.3,
O/Si : 0.3 to 4,
C/Si : 3 or less,
M/Si : 2.5 or less.

The metals M are preferably those of the groups IIa, IIIa, IIIb, IVa IVb, Va and Vb of the Periodic Table. Illustrative of suitable metals are Be, Mg, Ca, Sr, Ba, Sc, Y, lanthanoid elements, actinoid elements, B, Al, Ga, In, Tl, Ti, Zr, Hf, Si, Ge, Sn, Pb, V, Nb, Ta, As, Sb, and Bi. Above all, Al, Ti and Zr are especially preferred.

The ceramic may contain fine ceramic crystallites having a diameter of 10 um or less or may be substantially amorphous. Formation of crystallites having too large a diameter is disadvantageous because of reduction of mechanical strength. Preferred diameter of the ceramic crystallites is 2,000 Å less more preferably 1,000 Å or less. The size of the ceramic crystallites is measured by the Jones method from an X-ray-diffraction half value width. It is also preferred that the ceramic molded body have a three-point bending strength of 20 Kg/cm$^2$ or more preferably 100 Kg/cm$^2$ or more, for reasons of mechanical strength. The three-point bending strength is measured with a universal testing machine under the following conditions:

| cross sectional area of sample: | 4–7 mm$^2$ |
|---|---|
| span: | 10 mm |
| loading speed: | 1 mm/minute |

The molded body according to the present invention may be produced, for example, by solidifying a polysilazane or its derivative under vacuum or in the atmosphere of an inert gas, a reducing gas, an oxidizing gas or a mixture thereof, followed by calcination in such an atmosphere. The polysilazane is preferably a compound having a number average molecular weight of 100–500,000 and a main skeletal structure having the following recurring units:

wherein $R^1$, $R^2$ and $R^3$ represent, independently from each other, hydrogen, a hydrocarbyl group, a group other than the hydrocarbyl group and containing a carbon atom bonded directly to the silicon atom of the above formula, an alkylsilyl group, an alkylamino group or an alkoxy group. The hydrocarbyl group may be alkyl, alkenyl, aryl, cycloalkyl or aralkyl.

Examples of the alkyl group include methyl, ethyl, propyl, butyl, pentyl, hexyl, heptyl, octyl, nonyl and decyl. Examples of the alkenyl group include vinyl, allyl, butenyl, pentenyl, hexenyl, heptenyl, octenyl and decenyl. Examples of the cycloalkyl group include cyclobutyl, cyclopentyl, cyclohexyl and cycloheptyl. Examples of the aryl group include phenyl, tolyl, xylyl and naphthyl. Benzyl is an example of the aralkyl group.

Examples of suitable polysilazane compounds are given below.

(I) A polysilazane having a number average molecular weight of 100-50,000 and containing the following recurring unit:

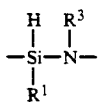

wherein $R^1$ and $R^3$ have the same meaning as above. Preferably, $R^1$ and $R^3$ represent, independently from each other, hydrogen or a lower alkyl. Such a polysilazane may be obtained by reacting a halosilane such as dichlorosilane with a base such as pyridine to form an adduct, and then reacting the adduct with ammonia. One preferred polysilazane is a polyorganohydrosilazane having a molecular weight of about 200-100,000 and a composition:

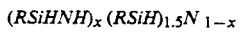

wherein R stands for alkyl, alkenyl, cycloalkyl, aryl, aralkyl, alkylsilyl, alkylamino, alkoxy or a group having a carbon atom directly bonded to the silicon atom of the above formula, and x is a number greater than 0.4 and smaller than 1.

(II) A reformed polysilazane having (a) a number average molecular weight of 200-500,000, preferably 500-10,000 (b) contents of Si, N and H of 50-70% by weight, 20-34% by weight and 5-9% by weight, respectively; and (c) —$SiH_2$— and —$SiH_3$ groups, the molar ratio of the former to the latter being 2.0:1 to 8.4:1. The reformed polysilazane may be prepared by reacting a solution of a raw material having the following recurring unit:

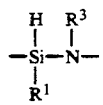

wherein $R^1$ and $R^3$ have the same meaning as above in an organic base-containing solvent at a temperature and for a period of time sufficient to polycondense the raw material.

The raw material may be the polysilazane mentioned in (1) above or a compound disclosed in U.S. Pat. No. 4,397,328, in an article A. Stock and K. Somiesk, Ber. Dtsch. Chem. Ges., 54, 740 (1921) or in an article W. M. Scantlin, Inorganic Chem., 11, (1972). The reaction temperature is generally −78° C. to 300° C. The organic base may be a tertiary amine or, a secondary amine with sterically bulky groups. Examples of the organic base include trimethylamine, dimethylethylamine, diethylmethylamine, triethylamine, pyridine and a substituted pyridine (such as picoline), dimethylaniline and a substituted dimethylaniline, pyrazine and a substituted pyrazine, pyrimidine and a substituted pyrimidine, pyridazine and a substituted pyridazine, pyrrole, 3-pyrroline, pyrazole, 2-pyrazoline and mixtures thereof. The above organic base may be used by itself or as a solution in a solvent such as an aliphatic hydrocarbon, alicyclic hydrocarbon, an aromatic hydrocarbon, a halogenated hydrocarbon or an ether. Illustrative of suitable solvents are methylene chloride, chloroform, carbon tetrachloride, bromoform, ethylene chloride, ethylidene chloride, trichloroethane, tetrachloroethane, ethyl ether, isopropyl ether, ethyl butyl ether, butyl ether, 1,2-dioxyethane, dioxane, dimethyl dioxane, tetrahydrofuran, tetrahydropyran, pentane, hexane, isohexane, methylpentane, heptane, isoheptane, octane, isooctane, cyclopentane, methylcyclopentane, cyclohexane, methylcyclohexane, benzene, toluene, xylene, ethylbenzene and mixtures thereof. The concentration of the polysilazane in the base solution is 0.1-50% by weight, preferably 1-12% by weight.

(III) A cross-linked polysilazane having a number average molecular weight of 200-500,000 and containing (a) a recurring unit of the formula:

wherein $R_1$ and $R_2$, independently from each other, stand for hydrogen, an alkyl, an alkenyl, a cycloalkyl, an alkylamino, an aryl or an alkylsilyl, group and (b) one or more cross-linkages of the formula:

wherein A stands for a direct bond or —$N(R^4)$- where $R^4$ stands for hydrogen, an alkyl, a cycloalkyl, an aryl, an aralkyl or a heterocyclic group, and $R_3$ stands for (1) hydrogen, an alkyl, an alkenyl, a cycloalkyl, an aryl, an aralkyl or —$N(R^5)(R^6)$— where $R^5$ and $R^6$, independently from each other, stand for an alkyl, a cycloalkyl, an aryl, an aralkyl or a heterocyclic group, when the group A is a direct bond or (2) hydrogen, an alkyl, an alkenyl, a cycloalkyl, an aryl, an aralkyl or a heterocyclic group, when the group A is —$N(R^4)$—, or (c) one or more groups of the formula:

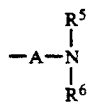

wherein A, $R^5$ and $R^6$ have the same meaning as above. The cross-linked polysilazane is preferably a compound having a number average molecular weight of 200-500,000, preferably 500-10,000 and an atomic ratio N/Si of at least 0.8 for N atoms directly bonded to the Si atoms and containing (a) a recurring unit of the formula —SiH$_2$—NH— and (b) one or more cross-linkages of the formula —NH—, —NHNH— or —N(NH$_2$)— crosslinking the (—SiH$_2$—NH—)$_n$ chains. The cross-linked polysilazane may be obtained by reacting a polysilazane as described in (I) above with ammonia or hydrazine in an organic base-containing solvent such as described in (II) above.

(IV) A polymetallosilazane having a metal/silicon atomic ratio of 0.001–30 and a number average molecular weight of 200–500,000, preferably 500–50,000 and obtained by reacting a raw material having a molecular weight of 100–50,000 and the following recurring unit:

wherein R$^1$ and R$^3$ represent, independently from each other, hydrogen, a hydrocarbyl group, a group other than the hydrocarbyl group and containing a carbon atom bonded direct to the silicon atom of the above formula, an alkylsilyl group, an alkylamino group or an alkoxy group, with a metal alkoxide of the formula M(OR$^4$)$_n$ wherein M is a metal of the group IIa, III, VI or V of the Periodic Table, R$_4$ is hydrogen, an alkyl having 1–20 carbon atoms or an aryl and n is the valence of the metal M with the proviso that at least one of the n number of R$_4$ is the alkyl or aryl. Preferred substituents R$^1$ and R$^2$ are each hydrogen or a lower alkyl.

(V) Polysiloxazane composed of the following two recurring units:

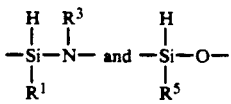

wherein R$^1$ and R$^3$ have the same meaning as above and R$^5$ represents hydrogen, a hydrocarbyl group, a group other than the hydrocarbyl group and containing a carbon atom bonded directly to the silicon atom of the above formulan alkylsilyl group, an alkylamino group or an alkoxy group, and having a degree of polymerization of 5–300. The hydrocarbyl group may be, for example, alkyl, alkenyl, cycloalkyl, aralkyl or aryl. One preferred polysiloxazane is that composed of the following two recurring units:

wherein n, m and r represent, independently from each other, an integer of 1, 2 or 3.

The molded body according to the present invention includes (a) one which is obtained from the above polysilazane only, (b) one which is obtained from the above polysilazane and a small amount of reinforcing powder (in this case, the polysilazane gives a ceramic matrix in which the reinforcing powder is dispersed), (c) one which is obtained from the above polysilazane and reinforcing fibers (in this case, too, the polysilazane forms a ceramic matrix in which the reinforcing fibers are dispersed), (d) one which is obtained from the above polysilazane and a relatively large amount of ceramic powder (in this case, the polysilazane serves to act as a binder). Methods of producing molded bodies of these types will be described in described below.

Molded bodies of (a) and (b) types may be produced by the same method which includes solidifying a raw material containing the above polysilazane in a mold cavity and calcining the solidified mass. The raw material may further contain a reinforcing powder such as ceramic powder and/or a hardener. Examples of such ceramic powder include metal nitrides, metal carbides and metal oxides. The use of the ceramic powder can prevent the occurrence of cracks during succeeding calcination and can improve mechanical properties of the molded body. The hardener may be, for example, an organic amine such as an alkyl amine or an alkyldiamine; an acid anhydride such as oxalic anhydride or malonic anhydride; an isocyanate such as methyl isocyanate or dimethylsilyldiisocyanate; a thiol such as butane dithiol or benzene dithiol, an imide such as malonimide or succinimide; a metal alkoxide such as of an element of the group IIa, III, IV or V of the Periodic Table; or an inorganic halide such as of iron, cobalt, nickel, copper, silver, gold, mercury, zinc, ruthenium, palladium, indium, titanium, hafnium, zirconium, aluminum, boron or phosphorus. The amount of the reinforcing powder is generally 0.1–60%, preferably 10–40% based on the total weight of the ceramic matrix and the powder.

The raw material is placed into a mold cavity and is solidified and simultaneously molded. The solidification conditions of temperature, pressure, environmental atmosphere and period of time may vary according to the kind of the polysilazane used and amount and kind of the hardener or reinforcing powder.

When a solid polysilazane is used, it is first dissolved in an organic solvent such as a hydrocarbon, a halogenated hydrocarbon or an ether. The solution is then poured into the mold cavity and is heated under a reduced pressure or ambient pressure to remove the organic solvent, thereby to obtain a solidified and molded product.

When the polysilazane to be used is a liquid, it is filled in a mold cavity and gradually heated from room temperature to about 400° C. at a pressure up to about 10 atm. for a period of time of about 0.5–72 hours in the atmosphere of an inert gas such as nitrogen or argon; a reducing gas such as ammonia, methlamine or hydrazine; an oxidizing gas such as air, oxygen or ozone; or a mixture of the foregoing. If desired, the solid polysilazane as such may be filled in the mold cavity and heated gradually to about 400° C. at a pressure of up to 10 atm. in a suitable atmosphere as exemplified above.

The solidification is considered to proceed by the following mechanisms. Under a reducing or oxiding gas atmosphere, the polysilazane is considered to undergo cross-linking reaction as a result of substitution of hydrogen of its Si—H groups. For instance, in the case of NH$_3$, there are formed Si—NH—Si cross-linkages and in the case of O$_2$, Si—O—Si cross-linkages are formed, so that the polysilazane becomes solid. When the solidification is performed in an inert gas atmosphere or under vacuo, cross-linking reactions are considered to occur as a result of intermolecular or intramolecular dehydrogenative condensation.

Any known mold can be used for the above solidification. It is advisable to coat the inside of the mold cavity with a mold releasing agent such as a silicone-based agent or a grease with or without dilution with an organic solvent.

The thus formed solidified product is then gradually heated to 500°-1700° C., preferably 800°-1300° C. at a heating rate of 20° C./min or less, preferably 5° C./min or less and maintained at that temperature for 48 hours or less, thereby to effect calcination and to obtain a desired molded body. A calcination temperature exceeding 1700° C. is not desirable because of a possible occurrence of decomposition. Too low a calcination temperature below 500° C. is also disadvantageous because of insufficient formation of ceramic and insufficient increase of mechanical properties. The thus obtained ceramic molded body may be impregnated with the above polysilazane, followed by solidification and calcination, so that the surface portion of the molded body becomes more dense.

A molded body of the above type (c), which is a fiber-reinforced composite molded body, may be produced by impregnating fibers with the above-described polysilazane and removing the solvent to form a prepreg (fiber-reinforced preceramic polymer). If desired, the impregnation may be followed by a treatment for solidifying the polysilazane. The prepreg is then cut into a desired pattern and cut patterns are superimposed and laminated, followed by calcination and press molding to give a molded, composite body. The solidification may be performed under a reduced pressure or in the atmosphere of an inert gas, an oxidizing gas, a reducing gas or a mixture thereof. Ceramic powder and/or hardener, which are described previously, may be also used in conjunction with the polysilazane for impregnation into the fibers. The hardener can facilitate the solidification of the polysilazane while the ceramic powder can prevent the occurrence of cracking of the molded body and can improve the mechanical properties of the molded body. The solidification of the polysilazane with which the fibers have been impregnated can be performed under the same conditions as those described above in connection with the production of the molded body of a type (a) or (b).

The fibers to be used as a reinforcing material may be, for example, glass fibers, carbon fibers, silicon nitride fibers, boron fibers, silicon carbide fibers, alumina fibers, asbestos fibers, silica fibers, silica-alumina fibers, boron nitride fibers, boron carbide fibers, silicon nitride-titanium carbide fibers, titanium boride fibers, silicon-titanium-carbonoxygen fibers, silicon-zirconium-carbon-oxygen fibers, silicon-metal-nitrogen-oxygen-carbon fibers where said metal is at least one selected from those of the groups IIa, III and V of the Periodic Table or tungsten fibers. The fibers may be continuous, chopped or in the form of fabrics. Preferably, the reinforcing fibers are silicon nitride-based ceramic fibers containing Si and N in amounts providing the atomic ratio N/Si of 0.3 to 3 and exhibiting small angle X-ray scattering such that the ratio of the intensity of the small angle scattering of the fibers to that of air is 1 to 20 at scattering angles 0.5° and 1°. The silicon nitride-based ceramic fibers may further contain at least one element selected from the group consisting of O, C, H and metals (those of groups IIa, III, IV and V of the Periodic Table) in amounts providing the following atomic ratios:

O/Si : 15 or less,
C/Si : 7 or less,
H/Si : 15 or less,
M/Si : 5 or less, where M stands for the metals.

The ceramic fibers may either be amorphous when heated at a temperature of 1200° C. for one hour in the atmosphere of an inert gas or contain fine ceramic crystallites having a diameter of 10 um or less. The reinforcing fibers are used in an amount of 5-75%, preferably 20-60% by volume based on the total volume of the fiber-reinforced ceramic molded body.

The thus obtained prepreg is, preferably after the solidification, then calcined and sintered in the atmosphere of an inert gas, a reducing gas, an oxidizing gas or a mixture thereof. A hot press method, an HIP method or slip cast method may be suitably adopted. The calcination and sintering may be performed at temperatures of 700°-2500° C., preferably 1000°-2000° C., more preferably 1100°-1800° C. at a pressure of from ambient pressure to 2000 Kg/cm$^2$ for a period of time of 48 hours or less with a heating rate of 20° C./min or less, preferably 5° C./min or less. The fiber-reinforced ceramic molded body can also be obtained by any customarily employed molding method such as a hand lay up method, vacuum pack method, press pack method, autoclave method, spray up method, cold press method, continuous laminating method, matched die method, preform press method, mat press method, prepreg cross press method, filament winding method, sheer molding compound method, bulk molding compound method, stamping method, transfer method, injection method, centrifuging method, rolling method, rolling laminating method or mold-pouring method.

The calcined and/or sintered composite ceramic molded body may be impregnated with the above polysilazane, followed by solidification and calcination. By repeating such operations it is possible to obtain a molded body a more dense surface.

The molded article of the type (d) above in which the polysilazane serves to act as a binder for ceramic powder may be obtained by forming a slurry containing the polysilazane and the ceramic powder in a suitable solvent and subjecting the slurry to a slurry moding. Alternatively, the slurry thus formed is converted into granules by evaporation of the solvent to dryness such as by means of a spray dryer and the resulting granules are is subjected to press molding. The polysilazane, in this case, serves as a binder not only in the press molding stage but also in the granule forming stage.

As the solvent for forming the slurry, there may be used an aliphatic hydrocarbon, a halogenated hydrocabon, or an aliphatic or alicyclic ether. Illustrative of suitable solvents are methylene chloride, chloroform, carbon tetrachloride, bromoform, ethylene chloride, ethylidene chloride, trichloroethane, tetrachloroethane, ethyl ether, isobropyl ether, ethyl butyl ether, butyl ether, 1,2-dioxyethane, dioxane, dimethyldioxane, tetrahydrofuran, teterahydropyrane, pentane, hexane, isohexane, methylpentane, heptane, isoheptane, octane, isooctane, cyclopentane, methylcyclopentane, cyclohexane, methylcyclohexane, benzene, toluene, xylene and ethylbenzene.

Any ceramic powder including metal nitrides, metal carbides and metal oxides may be used for the purpose of the present invention. The powder is generally used in an amount of 40-99.9%, preferably 50-90% based on the total weight of the polysilazane binder (on the calcined basis) and the powder. If desired, the calcined and/or sintered ceramic molded body may be impregnated with a solution of a polysilazane, followed by solidification and calcination. By repeating such operations it is possible to obtain a dense molded body.

The molded product thus obtained by slurry molding or press molding is then calcined and sintered to obtain a molded body according to the present invention in which the interstices between the ceramic powder are filled with amorphous or fine crystallites of silicon nitride formed as a result of the decomposition of the polysilazane. The calcination and sintering can be performed under vacuum or in the atmosphere of an inert gas, a reducing gas, an oxidizing gas or a mixture thereof at a temperature of 600°–2300° C.

The following examples will further illustrate the present invention.

REFERENCE EXAMPLE 1

Preparation of Perhydropolysilazane

To a four-necked 10 liter flask equipped with a gas feed conduit, a mechanical stirrer and a Dewar condenser, an oxygen-free, dry nitrogen gas was fed to the flask to replace the air within. After charging 4900 ml of dry pyridine (deaerated), the flask was cooled in an ice bath. Then 744 g of dichlorosilane were added into the flask to form a white precipitate of an adduct ($SiH_2Cl_2 \cdot 2C_5H_5N$). Subsequently, with stirring and cooling in the ice bath, 735 g of ammonia, which had been passed successively through a sodium hydroxide-containing tube and an active carbon-containing tube, was bubbled through the reaction mixture within the flask. The reaction was completed by heating the contents in the flask at 100° C. After completion of the reaction, the reaction mixture was centrifuged and the supernatant was washed with dry pyridine, followed by filtration in a nitrogen atmosphere to give 5100 ml of a filtrate containing perhydropolysilazane. The polysilazane was found to have a number-average molecular weight of 980.

REFERENCE EXAMPLE 2

Preparation of Reformed Polysilazane

A 5% solution (5000 ml) of perhydropolysilazane in pyridine, prepared in the same manner as that in Reference Example 1, was placed in a 10 liter autoclave and heated at 120° C. for 3 hours in a nitrogen atmosphere under autogeneous pressure. A large amount of a gas was found to be produced and the pressure within the autoclave was increased by 2.0 kg/cm$^2$ as a result of the reaction. After cooling to room temperature, the pressure within the autoclave was released while feeding a nitrogen gas, and 900 ml of ethylbenzene was mixed into the reaction mixture. The mixture was then distilled at 70° C. under vacuo to obtain a white powder (reformed perhydropolysilazane) having a number-average molecular weight of 1950.

REFERENCE EXAMPLE 3

Preparation of Crosslinked Polysilazane

A 5% solution (5000 ml) of perhydropolysilazane, prepared in the same manner as described in Reference Example 1, was charged in a stainless steel autoclave with a 10 liter interior volume, to which 100 g of anhydrous ammonia were added. The mixture was then reacted at 80° C. under autogeneous pressure for 3 hours with stirring. After cooling to room temperature, the pressure within the autoclave was released and nitrogen was fed thereto for purging. The thus obtained perhydropolysilazane reformed by crosslinking with ammonia was found to have a number average molecular weight of 2400 and a weight average molecular weight of 20000 by a gel permeation chromatography using polystyrene as standard.

Dry o-xylene (5000 ml) was then mixed with the reaction mixture and the solvent was removed by a rotary evaporator to reduce the volume to 1000 ml. Similar dilution and concentration operations were repeated twice more so that the solvent of the polysilazane solution became substantially o-xylene.

REFERENCE EXAMPLE 4

Preparation of Polyaluminosilazane

To a four-necked 2 liter flask equipped with a gas feed conduit, a magnetic stirrer, a seal cap and a Dewar condenser, a dry argon gas was fed to replace the air within the flask. After charging 14.7 g (72 mmol) of aluminum triisopropoxide, a 5 weight % solution of perhydropolysilazane in a dry o-xylene (the perhydropolysilazane was similar to that obtained in Reference Example 1) was fed to the flask using a syringe with stirring to obtain a homogeneous solution. The solution was then reacted at 80° C. with stirring in the atmosphere of argon. As a result, the colorless solution became light yellow. Gel permeation chromatography using a polystyrene as a standard revealed the formation of polyaluminosilazane having a number-average molecular weight of 1750 and a weight-average molecular weight of 14500.

REFERENCE EXAMPLE 5

Preparation of Polytitanosilazane

To a four-necked, 2 liter flask equipped with a gas feed conduit, a magnetic stirrer, a seal cap and a Dewar condenser, a dry nitrogen gas was fed to replace the air within the flask. After charging 1000 g of a 5 weight % solution of perhydropolysilazane in a dry o-xylene (the perhydropolysilazane was similar to that obtained in Reference Example 1) to the flask, a solution (6.5 ml) of titanium tetraisopropoxide (7.0 g, 24.6 mmol) in dry xylene was fed to the flask using a syringe with stirring. The reaction solution was changed from colorless to light brown, purple and finally black as the reaction proceeded. After completion of the reaction, the solvent was removed by distillation in vacuo to obtain, as a dark brown solid, polyhydrotitanosilazane with a yield of 84.0%. Gel permeation chromatography using a polystyrene as a standard revealed that the product had a number-average molecular weight of 1800 and a weight-average molecular weight of 15000.

REFERENCE EXAMPLE 6

Preparation of Perhydropolysiloxazane

To a four-necked 3 liter flask equipped with a gas feed conduit, a mechanical stirrer and a Dewar condenser, an oxygen-free, dry nitrogen gas was fed to replace the air within the flask. After charging 1500 ml of dry pyridine (deaerated), the flask was cooled in an ice bath. Then 158 g (1.56 mol) of dichlorosilane were added into the flask little by little for about 1 hour to form a white precipitate of an adduct ($SiH_2Cl_2 \cdot 2C_5H_5N$). Subsequently, with stirring and cooling in the ice bath, 157 g (9.22 mol) of ammonia and 13.9 g (0.772 mol) of water were added to the reaction mixture within the flask and the mixture was reacted. After completion of the reaction, the reaction mixture was filtered in a nitrogen atmosphere to give a filtrate containing perhydropolysiloxazane having a number-average molecular weight of 1400.

EXAMPLE 1

The perhydropolysilazane obtained in Reference Example 1 and containing a small amount of a solvent was poured into a glass mold whose inside surface was lined with a mold release agent. The mold containing the perhydropolysilazane was then placed in an autoclave and the solvent was removed by evaporation to dryness by maintaining the autoclave under vacuum. Thereafter, nitrogen gas was introduced to the autoclave to a pressure of 3 atm. and the mold was heated to 80° C. at that pressure, so that a white, translucent bar (2.5 mm×3 mm×20 mm) was obtained. The bar was then heated to 800° C. at a heating rate of 0.1° C./min in the atmosphere of nitrogen to form a brown ceramic bar. Chemical and X-ray diffraction analyses revealed that the ceramic bar consisted of Si, N and C, was amorphous and had an N/Si atomic ratio of 0.97 and an O/Si atomic ratio of 0.06. The three point bending strength of the bar was 73 Kg/cm$^2$.

EXAMPLE 2

Using the reformed polysilazane obtained in Reference Example 2 in lieu of the perhydropolysilazane, Example 1 was repeated in the same manner as described. The ceramic bar thus obtained was found to consist of Si, N and C, to have atomic ratios N/Si of 1.10, O/Si of 0.07 and C/Si of 0.01, to be amorphous and to have a bending strength of 98 Kg/cm$^2$.

EXAMPLE 3

Using the cross-linked polysilazane obtained in Reference Example 3 in lieu of the perhydropolysilazane, Example 1 was repeated in the same manner as described. The ceramic bar thus obtained was found to have atomic ratios N/Si of 1.24, O/Si of 0.04 and C/Si of 0.02, to be amorphous and to have a bending strength of 101 Kg/cm$^2$.

EXAMPLE 4

Using the polyaluminosilazane obtained in Reference Example 4 in lieu of the perhydropolysilazane, Example 1 was repeated in the same manner as described. The ceramic bar thus obtained was found to have atomic ratios N/Si of 1.02, O/Si of 0.37, Al/Si of 0.09 and C/Si of 0.66, to be amorphous and to have a bending strength of 105 Kg/cm$^2$.

EXAMPLE 5

Using the polytitanosilazane obtained in Reference Example 5 in lieu of the perhydropolysilazane, Example 1 was repeated in the same manner as described. The ceramic bar thus obtained was found to have atomic ratios N/Si of 0.96, O/Si of 0.24, Ti/Si of 0.02 and C/Si of 0.32, to be amorphous and to have a bending strength of 93 Kg/cm$^2$.

EXAMPLE 6

A bundle of carbon fibers consisting of 6000 filaments was immersed in a 75 wt % o-xylene solution of the reformed perhydropolysilazane obtained in Reference Example 2 to impregnate the fibers with the reformed polysilazane solution. The carbon fiber bundle was then wound around a straight-sided bobbin and heated at 90° C. in the atmosphere of nitrogen for curing. The thus obtained prepreg was removed from the bobbin and cut to form prepreg plates having a size of 30 mm×50 mm and a thickness of 1 mm. The plates were heated to 1000° C. for calcination in the atmosphere of nitrogen. The calcined plates were laminated and subjected to hot pressure at a temperature of 1700° C. and a pressure of 40 Kg/cm$^2$, to obtain a fiber-reinforced, composite, molded body having a fiber content of 56 volume %. The molded body was found to have a deflective strength of 60 Kg/mm$^2$ at 1400° C. (when subjected to a stress applied in the direction perpendicular to the axis of the fiber) and a 2.4 times as high fracture toughness $K_{IC}$ (critical stress intensity factor) as that of a molded body formed only of the matrix ceramic. The matrix of the fiber-reinforced body had atomic ratios N/Si of 1.25, O/Si of 0.05 and C/Si of 0.06.

EXAMPLE 7

Using a 77 wt % solution o-xylene solution of the perhydropolysiloxazane obtained in Reference Example 6 in place of the perhydropolysilazane solution, Example 6 was repeated in the same manner as described, thereby to obtain a fiber-reinforced, composite, molded body having a fiber content of 47 volume %. The molded body was found to have a deflective strength of 64 Kg/mm$^2$ at 1400° C. (when subjected to a stress applied in the direction perpendicular to the axis of the fiber) and about 2 times as high fracture toughness $K_{IC}$ as that of a molded body formed only of the matrix ceramic. The matrix of the fiber-reinforced body had atomic ratios N/Si of 0.97, O/Si of 0.50 and C/Si of 0.03.

EXAMPLE 8

A bundle of silicon nitride fibers (500 filaments) was wound around a straight-sided bobbin and the bobbin was placed in a mold cavity, into which a 75 wt % o-xylene solution of the polyaluminosilazane obtained in Reference Example 4 was poured to impregnate the fibers therewith. The wound bundle was then pressed at a pressure of 100 Kg/cm$^2$, placed in an autoclave molding machine and molded at 130° C. under a nitrogen pressure of 5 Kg/cm$^2$, thereby to obtain a flat plate. This was cut into prepreg plates having a size of 15 mm×50 mm and a width of 1 mm. The prepreg plates were heated to 1000° C. for calcination in the atmosphere of nitrogen. The calcined plates were laminated and subjected to hot pressing at a temperature of 1700° C. and a pressure of 400 Kg/cm$^2$, to obtain a fiber-reinforced, composite, molded body having a fiber content of 40 volume %. The molded body was found to have a deflective strength of 57 Kg/mm$^2$ at 1400° C. (when subjected to a stress applied in the direction perpendicular to the axis of the fiber) and a 1.5 times as high fracture toughness $K_{IC}$ as that of a molded body formed only of the matrix ceramic. The matrix of the fiber-reinforced body had atomic ratios N/Si of 1.00, O/Si of 0.36, C/Si of 0.64 and Al/Si of 0.09.

EXAMPLE 9

Using a 80% solution o-xylene solution of the perhydrotitanopolysilazane obtained in Reference Example 5 in place of the perhydroaluminopolysilazane solution, Example 8 was repeated in the same manner as described, thereby to obtain a fiber-reinforced, composite, molded body having a fiber content of 40 volume %. The molded body was found to have a deflective strength of 55 Kg/mm$^2$ at 1400° C. (when subjected to a stress applied in the direction perpendicular to the axis of the fiber) and a 1.8 times as high fracture toughness $K_{IC}$ as that of a molded body formed only of the matrix ceramic. The matrix of the fiber-reinforced body had atomic ratios N/Si of 0.95, O/Si of 0.23, C/Si of 0.30 and Ti/Si of 0.02.

EXAMPLE 10

To 40 parts by weight of a 75% o-xylene solution of the reformed perhydropolysilazane obtained in Reference Example 2 were mixed 10 parts by weight of finely divided alumina. Using this mixture in place of the reformed perhydropolysilazane solution, Example 6 was repeated in the same manner as described (The hot pressing was carried out at 1600° C.), thereby to obtain a fiber-reinforced, alumina-containing molded body having a fiber content of 49 volume %. The molded body was found to have a deflective strength of 68 Kg/mm$^2$ at 1400° C. (when subjected to a stress applied in the direction perpendicular to the axis of the fiber) and about 2.8 times as high fracture toughness $K_{IC}$ as that of a molded body formed only of the matrix ceramic. The matrix of the fiber-reinforced body had atomic ratios N/Si of 1.23, O/Si of 0.48, C/Si of 0.05 and Al/Si of 0.27. By the addition of alumina powder, the toughness of the molded body was found to be improved.

EXAMPLE 11

Si$_3$N$_4$ powder having a particle size of 200 mesh (Tyler) or finer was mixed with an o-xylene solution of the perhydropolysilazane obtained in Reference Example 1 with a mixing ratio of the former to the latter of 9:1 calculated as solvent-free perhydropolysilazane. The solvent was then evaporated to dryness and the dried mixture was ground and rated with a sieve as having a particle size of 100 mesh or finer. The resulting powder was press-molded at a pressure of 1500 Kg/cm$^2$ to obtain a molded product of 10 mm×50 mm×5 mm. The molded product was then heated to 1200° C. at a heating rate of 200° C./hour in a nitrogen gas atmosphere for calcination, thereby to obtain a Si$_3$N$_4$ molded body having a bulk density of 2.60 g/cm$^3$, a deflective strength of 13.5 Kg/mm$^2$ and atomic ratios of N/Si of 1.25, O/Si of 0.05 and C/Si of 0.06.

EXAMPLE 12

SiC powder having a particle size of 200 mesh (Tyler) or finer was mixed with a n-hexane solution of the perhydropolysilazane obtained in Reference Example 1 with a mixing ratio of the former to the latter of 9:1 calculated as solvent-free perhydropolysilazane. The solvent was then evaporated to dryness and the dried mixture was heated to 600° C. at a heating rate of 100° C./hour for precalcination. After being ground, the precalcined product was mixed again with a n-hexane solution of the perhydropolysilazane obtained in Reference Example 1 with a mixing ratio of the former to the latter of 95:5 calculated as solvent-free perhydropolysilazane. This mixture was dried and ground to a powder. The resulting powder was press-molded at a pressure of 2000 Kg/cm$^2$ to obtain a molded product of 10 mm×50 mm×5 mm. The molded product was then heated to 1400° C. at a heating rate of 100° C./hour in a nitrogen gas atmosphere for calcination, thereby to obtain an SiC molded body having a bulk density of 2.66 g/cm$^3$ and a deflective strength of 12.4 Kg/mm$^2$.

EXAMPLE 13

A suitable amount of benzene, 93 parts by weight of alpha-Al$_2$O$_3$ powder having a particle size of 200 mesh (Tyler) or finer and 7 parts by weight of powder of the perhydropolysilazane obtained in Reference Example 2 were mixed with each other and the mixture was dried and ground to a powder. The resulting powder was press-molded at a pressure of 3000 Kg/cm$^2$ to obtain a molded product of 10 mm×50 mm×5 mm. The molded product was then heated to 1000° C. at a heating rate of 200° C./hour in a nitrogen gas atmosphere for calcination, thereby to obtain an Al$_2$O$_3$ molded body having a bulk density of 3.12 g/cm$^3$ and a deflective strength of 7.5 Kg/mm$^2$.

EXAMPLE 14

A suitable amount of o-xylene, 85 parts by weight of Si$_3$N$_4$ powder having a particle size of 200 mesh (Tyler) or finer and 15 parts by weight of powder of the perhydropolysilazane obtained in Reference Example 2 were mixed with each other and the mixture was dried, heated to 600° C. at a heating rate of 100° C./hour for precalcination and ground to a powder. The resulting powder (95 parts by weight) was mixed with the above perhydropolysilazane powder (5 parts by weight) together with a quantity of o-xylene to form a slurry having a viscosity of about 200 cps. The slurry was dried with a spray drier to form granules having an average diameter of 80 u. The granules were placed within a carbon die and press-molded at a temperature of 1750° C. for 1 hour in the atmosphere of nitrogen to obtain a Si$_3$N$_4$ sintered, molded body having a bulk density of 3.02 g/cm$^3$ and a deflective strength of 27.3 Kg/mm$^2$.

EXAMPLE 15

50 Parts by weight of Si$_3$N$_4$ powder having a particle size of 200 mesh (Tyler) or finer and 50 parts by weight of a liquid perhydropolysilazane obtained in Reference Example 1 were mixed with each other to form a slurry. The slurry was then extruded and the extrudate was heated to 1500° C. at a heating rate of 100° C./hour in the atmosphere of nitrogen for calcination, to thereby obtain a Si$_3$N$_4$ molded body having a bulk density of 2.67 g/cm$^3$ and a deflective strength of 15.8 Kg/mm$^2$.

EXAMPLE 16

A suitable amount of o-xylene, 50 parts by weight of Si$_3$N$_4$ powder having a particle size of 200 mesh (Tyler) or finer and 50 parts by weight of powder of the perhydropolysilazane obtained in Reference Example 2 were mixed with each other to obtain a slurry having a viscosity of about 400 cps. The slurry was then poured into a cavity of a ceramic mold and heated to 1500° C. at a heating rate of 100° C./hour in a nitrogen gas atmosphere for calcination, to thereby obtain a Si$_3$N$_4$ molded body having a bulk density of 2.83 g/cm$^3$ and a deflective strength of 15.0 Kg/mm$^2$.

EXAMPLE 17

Example 1 was repeated in the same manner as described to obtain a Si$_3$N$_4$ molded body having the same bulk density and deflective strength. The molded body was then immersed in a xylene solution containing 50% by weight of the perhydropolysilazane obtained in Reference Example 1. The thus impregnated body was dried and heated to 1400° C. at a heating rate of 200°

C./hour in a nitrogen gas atmosphere for calcination. Similar impregnation, drying and calcination treatment was repeated twice more to thereby obtain a $Si_3N_4$ molded body having a bulk density of 2.83 g/cm$^3$ and a deflective strength of 22.2 Kg/mm$^2$.

EXAMPLE 18

40 Parts by weight of commercially available $Si_3N_4$ wisker and 60 parts by weight of a liquid perhydropolysilazane obtained in Reference Example 1 were mixed with each other to form a slurry. The slurry was then extruded and the extrudate was heated to 1500° C. at a heating rate of 100° C./hour in the atmosphere of nitrogen for calcination, to thereby obtain a $Si_3N_4$ molded body having a bulk density of 2.60 g/cm$^3$, a deflective strength of 25.7 Kg/mm$^2$ and a fracture toughness of 8.5 Kg/mm$^2$.

EXAMPLE 19

A suitable amount of o-xylene, 60 parts by weight of $Si_3N_4$ powder having a particle size of 325 mesh or finer, 5 parts by weight of alpha-$Al_2O_3$ powder having a particle size of 0.3 um, 5 parts by weight of $Y_2O_3$ powder having a particle size of 1 um and 30 parts by weight of powder of the perhydropolysilazane obtained in Reference Example 2 were mixed with each other to form a slurry having a viscosity of about 200 cps. The slurry was dried with a spray drier to form granules having an average diameter of 100 um. The granules were placed within a carbon die and press-molded at a pressure of 2000 kg/cm$^2$ to form a molded product having a size of 10 mm×50 mm×5 mm. The product was then heated to a temperature of 1500° C. at a heating rate of 200° C./hour in the atmosphere of nitrogen to obtain a sintered, molded body having a bulk density of 2.87 g/cm$^3$ and a deflective strength of 33.2 Kg/mm$^2$.

EXAMPLE 20

Example 13 was repeated in the same manner as described except that the perhydropolysilazane was replaced by the polysiloxazane obtained in Reference Example 6, to thereby obtain an $Al_2O_3$ sintered, molded body having a bulk density of 3.50 g/cm$^3$ and a deflective strength of 12.5 Kg/mm$^2$, which are greater than those in Example 13.

EXAMPLE 21

Example 12 was repeated in the same manner as described except that the perhydropolysilazane was replaced by the polyorganohydrosilazane, to thereby obtain a SiC sintered, molded body having a bulk density of 2.78 g/cm$^3$ and a deflective strength of 16.5 Kg/mm$^2$, which are greater than those in Example 12.

EXAMPLE 22

A suitable amount of o-xylene, 90 parts by weight of an equimolar mixture of $Si_3N_4$ powder having an average particle size of 1 um, $Al_2O_3$ powder having an average particle size of 0.3 um and AlN powder having an average particle size of 0.5 um, and 10 parts by weight of powder of the polyaluminosilazane obtained in Reference Example 4 were mixed with each other and the mixture was dried, ground to a powder and rated as having a particle size of 100 mesh or finer. The resulting powder was press-molded at a pressure of 2000 Kg/cm$^2$ to obtain a molded product of 10 mm×50 mm×5 mm. The molded product was then heated to 1550° C. at a heating rate of 200° C./hour in a nitrogen gas atmosphere for calcination, thereby to obtain a molded body having a bulk density of 2.90 g/cm$^3$ and a deflective strength of 35.8 Kg/mm$^2$.

COMPARATIVE EXAMPLE 1

A suitable amount of o-xylene, 90 parts by weight of $Si_3N_4$ powder having a particle size of 325 mesh or finer, 5 parts by weight of alpha-$Al_2O_3$ powder having a particle size of 0.3 um, 5 parts by weight of $Y_2O_3$ powder having a particle size of 1 um and a quantity of a commercially available wax binder were mixed with each other to form a slurry having a viscosity of about 200 cps. The slurry was dried with a spray drier to form granules having an average diameter of 100 u. The granules were placed within a carbon die and press-molded at a pressure of 2000 kg/cm$^2$ to form a molded product having a size of 10 mm×50 mm×5 mm. The product was subjected to a degreasing treatment by heating to 400° C. at a rate of 10° C./hour and then heated to a temperature of 1500° C. at a heating rate of 200° C./hour in the atmosphere of nitrogen to obtain a sintered, molded body having a bulk density of 1.92 g/cm$^3$ and a deflective strength of 9.8 Kg/mm$^2$, which are considerably smaller than those in Example 19.

COMPARATIVE EXAMPLE 2

Example 22 was repeated in the same manner as described except that no polyaluminosilazane was used. The molded product was found to have a bulk density of 2.2 g/cm$^3$.

What is claimed is:

1. A molded body formed of an substantially amorphous silicon nitride-based ceramic containing Si, C and N in amounts providing an atomic ratio N/Si of 0.3 to 1.3 and an atomic ratio C/Si of 0.1 or less said ceramic being formed by solidifying and calcining a polysilazane having a number average molecular weight of 100–500,000 and a main skeletal structure having the recurring unit —$SiH_2$—NH—.

2. A molded body as set forth in claim 1, and having a three-point bending strength of 20 kg/cm$^2$ or more.

3. A molded body as set forth in claim 1, wherein said ceramic further contains O, and metals other than silicon in amounts providing the following atomic ratios:
O/Si : 0.05–15, and
M/Si : 9 or less, where M stands for said metals.

4. A molded body as set forth in claim 3, wherein said metals are selected from the group consisting of groups IIa, IIIa, IIIb, IVa IVb, Va and Vb of the Periodic Table.

5. A molded body as set forth in claim 4, wherein said metals are selected from the group consisting of Be, Mg, Ca, Sr, Ba, Sc, Y, lanthanides, actinides, B, Al, Ga, In, Tl, Ti, Zr, Hf, Si, Ge, Sn, Pb, V, Nb, Ta, As, Sb, and Bi.

6. A molded body as set forth in claim 5 wherein said metals are selected from the group consisting of Al, Ti and Zr.

7. A molded body as set forth in claim 1, wherein said polysilazane has a number average molecular weight of 200–500,000 and an atomic ratio N/Si of at least 0.8 and is cross-linked by one or more cross-linkages of the formula —NH—, —NHNH— or —N($NH_2$)—cross-linking the (—$SiH_2$—NH—)$_n$ chains.

8. A molded body as set forth in claim 1, wherein said polysilazane is a polymetallosilazane having a metal/silicon atomic ratio of 0.001–30 and a number molecular weight of 200–500,000 and obtained by reacting a raw material having a molecular weight of 100–50,000 and the recurring unit —SiH$_2$—NH— with a metal alkoxide of the formula M(OR$^4$)$_n$ wherein M is a metal of the group IIa, III, VI or V of the Periodic Table, R$_4$ is hydrogen, an alkyl having 1-20 carbon atoms or an aryl and n is the valence of the metal M with the proviso that at least one of the n number of the R$_4$ is the alkyl or aryl.

9. A composite, molded body formed of an substantially amorphous silicon nitride-based ceramic containing Si, C and N in amounts providing an atomic ratio N/Si of 0.3 to 1.3 and an atomic ratio C/Si of 0.1 or less and a reinforcing material, said ceramic being formed by solidifying and calcining a polysilazane having a number average molecular weight of 100-500,000 and a main skeletal structure having the recurring unit —SiH$_2$—NH—.

10. A composite, molded body as set forth in claim 9, wherein said ceramic further contains O and metals other than silicon in amounts providing the following atomic ratios:
O/Si : 0.05-15, and
M/Si : 9 or less, where M stands for said metals.

11. A composite, molded body as set forth in claim 10, wherein said metals are selected from the group consisting of groups IIa, IIIa, IIIb, IVa IVb, Va and Vb of the Periodic Table.

12. A composite, molded body as set forth in claim 11, wherein said metals are selected from the group consisting of Be, Mg, Ca, Sr, Ba, Sc, Y, lanthanides, actinides, B, Al, Ga, In, Tl, Ti, Zr, Hf, Si, Ge, Sn, Pb, V, Nb, Ta, As, Sb, and Bi.

13. A composite, molded body as set forth in claim 12, wherein said metals are selected from the group consisting of Al, Ti and Zr.

14. A composite, molded body as set forth in claim 9, wherein said polysilazane has a number average molecular weight of 200-500,000 and an atomic ratio N/Si of at least 0.8 an is cross-linked by one or more cross-linkages of the formula —NH—, —NHNH— or —N(NH$_2$)— crosslinking the (—SiH$_2$—NH—)$_n$ chains.

15. A composite, molded body as set forth in claim 9, wherein said polysilazane is a polymetallosilazane having a metal/silicon atomic ratio of 0.001-30 and a number molecular weight of 200-500,000 and obtained by reacting a raw material having a molecular weight of 100-50,000 and the recurring unit —SiH$_2$—NH— with a metal alkoxide of the formula M(OR$^4$)$_n$ wherein M is a metal of the group IIa, III, VI or V of the Periodic Table, R$_4$ is hydrogen, an alkyl having 1-20 carbon atoms or an aryl and n is the valence of the metal M with the proviso that at least one of the n number of the R$_4$ is the alkyl or aryl.

16. A composite, molded body as set forth in claim 9, wherein said reinforcing material is in the form of powder and is homogeneously dispersed in said molded body with said ceramic serving as a matrix.

17. A composite, molded body as set forth in claim 16, wherein said powder is used in an amount of 0.1-60% based on the total weight of said ceramic matrix and said powder.

18. A composite, molded body as set forth in claim 16, wherein said reinforcing material is ceramic powder.

19. A composite, molded body as set forth in claim 18, wherein said ceramic powder is formed of a metal nitride, a metal carbide or a metal oxide.

20. A composite, molded body as set forth in claim 9, wherein said reinforcing material is in the form of powder bound with said ceramic serving as a binder.

21. A composite, molded body as set forth in claim 20, wherein said powder is used in an amount of 40-99.9% based on the total weight of said ceramic binder and said powder.

22. A composite, molded body as set forth in claim 20, wherein said reinforcing material is ceramic powder.

23. A composite, molded body as set forth in claim 22, wherein said ceramic powder is formed of a metal nitride, a metal carbide or a metal oxide.

24. A composite, molded body as set forth in claim 9, wherein said reinforcing material is in the form of fibers dispersed in said molded body with said ceramic serving as a matrix.

25. A composite, molded body as set forth in claim 24, wherein said fibers are used in an amount of 5-75% by volume.

26. A composite, molded body as set forth in claim 24, wherein said fibers are glass fibers, carbon fibers, silicon nitride fibers, boron fibers, silicon carbide fibers, alumina fibers, asbestos fibers, silica fibers, silica-alumina fibers, boron nitride fibers, boron carbide fibers, silicon nitride-titanium carbide fibers, titanium boride fibers, silicon-titanium-carbon-oxygen fibers, silicon-zirconium-carbon-oxygen fibers, silicon-metal-nitrogen-oxygen-carbon fibers where said metal is at least one selected from those of the group IIa, III and V of the Periodic Table or tungsten fibers.

27. A composite, molded body as set forth in claim 26, wherein said fibers are silicon nitride-based ceramic fibers containing Si and N in amounts providing the atomic ratio N/Si of 0.3 to 3 and exhibiting an X-ray small angle scattering such that the ratio of the intensity of the small angle scattering of the fibers to that of air is 1 to 20 at scattering angles 0.5° and 1°.

28. A composite, molded body as set forth in claim 27, wherein said ceramic fibers are amorphous when heated at a temperature of 1200° C. for one hour in the atmosphere of an inert gas.

29. A composite, molded body as set forth in claim 27, wherein said ceramic fibers contain fine ceramic crystallites having a diameter of 2000 Å or less.

30. A composite, molded body as set forth in claim 27, wherein said ceramic fibers further contain O and metals other than silicon in amounts providing the following atomic ratios:
O/Si : 15 or less, and
L/Si : 5 or less, where L stands for said metals.

31. A composite, molded body as set forth in claim 9, wherein said reinforcing material is a mixture of fibers and powder, said fibers being dispersed in said molded body with said ceramic serving as a ceramic matrix, and said powder being dispersed in said ceramic matrix.

32. A composite, molded body as set forth in claim 31, wherein said fibers are used in an amount of 5-75% by volume.

33. A composite, molded body as set forth in claim 31, wherein said fibers are glass fibers, carbon fibers, silicon nitride fibers, boron fibers, silicon carbide fibers, alumina fibers, asbestos fibers, silica fibers, silica-alumina fibers, boron nitride fibers, boron carbide fibers, silicon nitride-titanium carbide fibers, titanium boride fibers, silicon-titanium-carbon-oxygen fibers, silicon-zirconium-carbon-oxygen fibers, silicon-metal-nitrogen-oxygen-carbon fibers where said metal is at least one selected from those of the group IIa, III and V of the Periodic Table or tungsten fibers.

34. A composite, molded body as set forth in claim 33, wherein said fibers are silicon nitride-based ceramic fibers containing Si and N in amounts providing the atomic ratio N/Si of 0.3 to 3 and exhibiting an X-ray small angle scattering such that the ratio of the intensity of the small angle scattering of the fibers to that of air is 1 to 20 at scattering angles 0.5° and 1°.

35. A composite, molded body as set forth in claim 34, wherein said ceramic fibers are amorphous when heated at a temperature of 1200° C. for one hour in the atmosphere of an inert gas.

36. A composite, molded body as set forth in claim 34, wherein said ceramic fibers contain fine ceramic crystallites having a diameter of 2000 Å or less.

37. A composite, molded body as set forth in claim 34, wherein said ceramic fibers further contain O and metals other than silicon in amounts providing the following atomic ratios:
O/Si : 15 or less, and
L/Si : 5 or less, where L stands for said metals.

38. A composite, molded body as set forth in claim 31, wherein said powder is used in an amount of 0.1–60% based on the total weight of said ceramic matrix and said powder.

39. A composite, molded body as set forth in claim 31, wherein said powder is a ceramic powder.

40. A composite, molded body as set forth in claim 39, wherein said ceramic powder is formed of a metal nitride, a metal carbide or a metal oxide.

41. A composite, molded body as set forth in claim 27, wherein said powder is used in an amount of 10–40% based on the total weight of said ceramic matrix and said powder.

42. A composite, molded body as set forth in claim 21, wherein said powder is used in an amount of 50–90% based on the total weight of said ceramic binder and said powder.

43. A composite, molded body as set forth in claim 38, wherein said powder is used in an amount of 10–40% based on the total weight of said ceramic matrix and said powder.

* * * * *